United States Patent
Johnson et al.

(10) Patent No.: US 11,119,624 B2
(45) Date of Patent: Sep. 14, 2021

(54) DYNAMIC IMAGE STABILIZATION USING MOTION SENSORS

(71) Applicant: Apple Inc., Cupertino, CA (US)

(72) Inventors: Paul V. Johnson, San Francisco, CA (US); Ahmad Rahmati, Mountain View, CA (US); Chaohao Wang, Sunnyvale, CA (US); Cheng Chen, San Jose, CA (US); Graham B. Myhre, San Jose, CA (US); Jiaying Wu, San Jose, CA (US); Paolo Sacchetto, Cupertino, CA (US); Sheng Zhang, Milpitas, CA (US); Yunhui Hou, San Jose, CA (US); Xiaokai Li, Sunnyvale, CA (US); Tim H. Cornelissen, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/366,503

(22) Filed: Mar. 27, 2019

(65) Prior Publication Data
US 2019/0317659 A1    Oct. 17, 2019

Related U.S. Application Data

(60) Provisional application No. 62/658,965, filed on Apr. 17, 2018.

(51) Int. Cl.
*G06F 3/0485* (2013.01)
*G06F 3/0481* (2013.01)
(Continued)

(52) U.S. Cl.
CPC ........ *G06F 3/0481* (2013.01); *G06F 3/04845* (2013.01); *G06F 3/012* (2013.01); *G06F 3/013* (2013.01)

(58) Field of Classification Search
CPC .......... G06F 3/011; G06F 3/013; G06F 3/012; G02B 27/017
See application file for complete search history.

(56) References Cited

U.S. PATENT DOCUMENTS 9,013,634 B2 * 4/2015 Agarwala ............ G11B 27/031
348/701
9,046,676 B2 * 6/2015 Sugita ............ G02B 15/145125
(Continued)

OTHER PUBLICATIONS

Rahmati, Ahmad ; Shepard, Clayton ; Zhong, Lin; "NoShake: Content stabilization for shaking screens of mobile devices"; Mar. 9-13, 2009; 2009 IEEE International Conference on Pervasive Computing and Communications (Year: 2009).*

*Primary Examiner* — Jordany Nunez
(74) *Attorney, Agent, or Firm* — Treyz Law Group, P.C.; Jason Tsai

(57) ABSTRACT

An electronic device may include a display for displaying image content to a user and dynamic image stabilization circuitry for dynamically compensating the image content if the device is moving unpredictably to help keep the image content aligned with the user's gaze. The electronic device may include sensors for detecting the displacement of the device. The dynamic image stabilization circuitry may include a usage scenario detection circuit and a content displacement compensation calculation circuit. The usage scenario detection circuit receives data from the sensors and infers a usage scenario based on the sensor data. The content displacement compensation calculation circuit uses the inferred usage scenario to compute a displacement amount by which to adjust image content. When motion stops, the image content may gradually drift back to the center of the display.

4 Claims, 10 Drawing Sheets

(51) Int. Cl.
    *G06F 3/0488*    (2013.01)
    *G06F 3/0484*    (2013.01)
    *G06F 3/01*    (2006.01)

(56) References Cited

U.S. PATENT DOCUMENTS

| | | | |
|---|---|---|---|
| 9,354,709 B1 * | 5/2016 | Heller | G06F 3/0346 |
| 9,478,045 B1 * | 10/2016 | Hunnicutt | G09G 3/20 |
| 9,720,496 B2 | 8/2017 | Cancel Olmo et al. | |
| 9,868,025 B2 * | 1/2018 | Cygan | A63B 24/0087 |
| 9,940,521 B2 * | 4/2018 | Tokutake | G06F 3/0412 |
| 10,165,186 B1 | 12/2018 | Brailovskiy et al. | |
| 2008/0034321 A1 * | 2/2008 | Griffin | G06F 1/1694 |
| | | | 715/799 |
| 2011/0221896 A1 | 9/2011 | Haddick et al. | |
| 2013/0107066 A1 | 5/2013 | Venkatraman et al. | |
| 2015/0271408 A1 * | 9/2015 | Cancel Olmo | G06F 1/1626 |
| | | | 348/208.6 |
| 2016/0077592 A1 * | 3/2016 | Bhesania | G06F 3/012 |
| | | | 345/650 |
| 2016/0189351 A1 * | 6/2016 | Holz | G06F 3/017 |
| | | | 345/647 |
| 2017/0064157 A1 * | 3/2017 | Lawrence | G06T 7/74 |
| 2018/0053056 A1 * | 2/2018 | Rabinovich | G06K 9/627 |

\* cited by examiner

DYNAMIC IMAGE STABILIZATION USING MOTION SENSORS

This application claims the benefit of provisional patent application No. 62/658,965, filed Apr. 17, 2018, which is hereby incorporated by reference herein in its entirety.

BACKGROUND

This relates generally to electronic devices and, more particularly, to portable electronic devices that display images to a user.

Under certain usage scenarios, the text on a portable electronic device can be difficult to read. For example, it might be difficult to read a text message when the screen is shaking, which can occur when the user is walking or jogging or when the user is sitting in a car on a bumpy road. Under such scenarios, the portable electronic device can move around with respect to the user's head or vibrate in unpredictable ways, which makes the text message illegible to the user.

It is within this context that the embodiments herein arise.

SUMMARY

A portable electronic device may have a display configured to output an image content to a user, a sensor configured to detect motion of the electronic device, and dynamic image stabilization circuitry that is used to adjust the image content on the display based on the detected motion of the electronic device. The dynamic image stabilization circuitry may include a usage scenario detection circuit configured to determine a current usage scenario of the device from a list of predetermined usage scenarios. Each usage scenario in the list of predetermined usage scenarios may require a different amount of compensation (i.e., a different amount or type of adjustment to the image content). The dynamic stabilization circuitry may further include a content displacement compensation calculation circuit configured to compute an amount by which to adjust the image content based on the current usage scenario of the device as determined by the usage scenario detection circuit.

The dynamic stabilization circuitry may be used to adjust the image content by dynamically shifting the image content along the plane of the display or dynamically magnifying/minifying the image content in a direction that opposes the movement of the electronic device. When the device has stopped moving, the image content may gradually drift back to the center of the display.

The electronic device may further include a head tracking system configured to detect the motion of the user's head relative to the device. The image content should be adjusted only when the motion of the user's head is out of sync with that of the device. Additional external devices (e.g., a set of earbuds, a wrist watch, a pair of glasses, a head-mounted device, etc.) paired with the electronic device may gather additional sensor data that can help further improve the accuracy of the compensation provided by the dynamic image stabilization circuitry.

DETAILED DESCRIPTION

Electronic devices may be provided with displays. The displays are used to display image content to users. Under certain usage scenarios such as when the movement of an electronic device is out of sync with a user's head (i.e., the device and the user's head are moving in different directions and/or at different rates), the user may have a difficult time viewing the image content. To mitigate this effect, the electronic device may be provided with at least one motion sensor for detecting in what direction the device is currently moving and with dynamic image stabilization circuitry for dynamically shifting the image content in real-time based on the detected direction. For example, the motion sensor may detect that the device is moving in one direction, so the dynamic image stabilization circuitry may compensate for that device movement by shifting the image content in an opposite direction to help keep the image content more aligned with the user's gaze.

The dynamic image stabilization circuitry may leverage machine learning techniques by analyzing a training dataset in a controlled environment to infer or predict a current usage scenario based on the detected motion pattern. Certain usage scenarios may require strong image compensation while other usage scenarios may require relatively weaker or no image compensation. Once the current usage scenario has been determined, a content displacement compensation calculation circuit in the dynamic image stabilization circuitry may then compute a desired amount of image content displacement, which should gradually drift back to the center of the display when the motion stops. Computation of the image content displacement may be based on a spring-damper model utilizing an optimal damping factor for smooth image compensation.

It will be recognized by one skilled in the art, that the present embodiments may be practiced without some or all of these specific details. In other instances, well-known operations have not been described in detail in order not to unnecessarily obscure the present embodiment.

Figure 1:
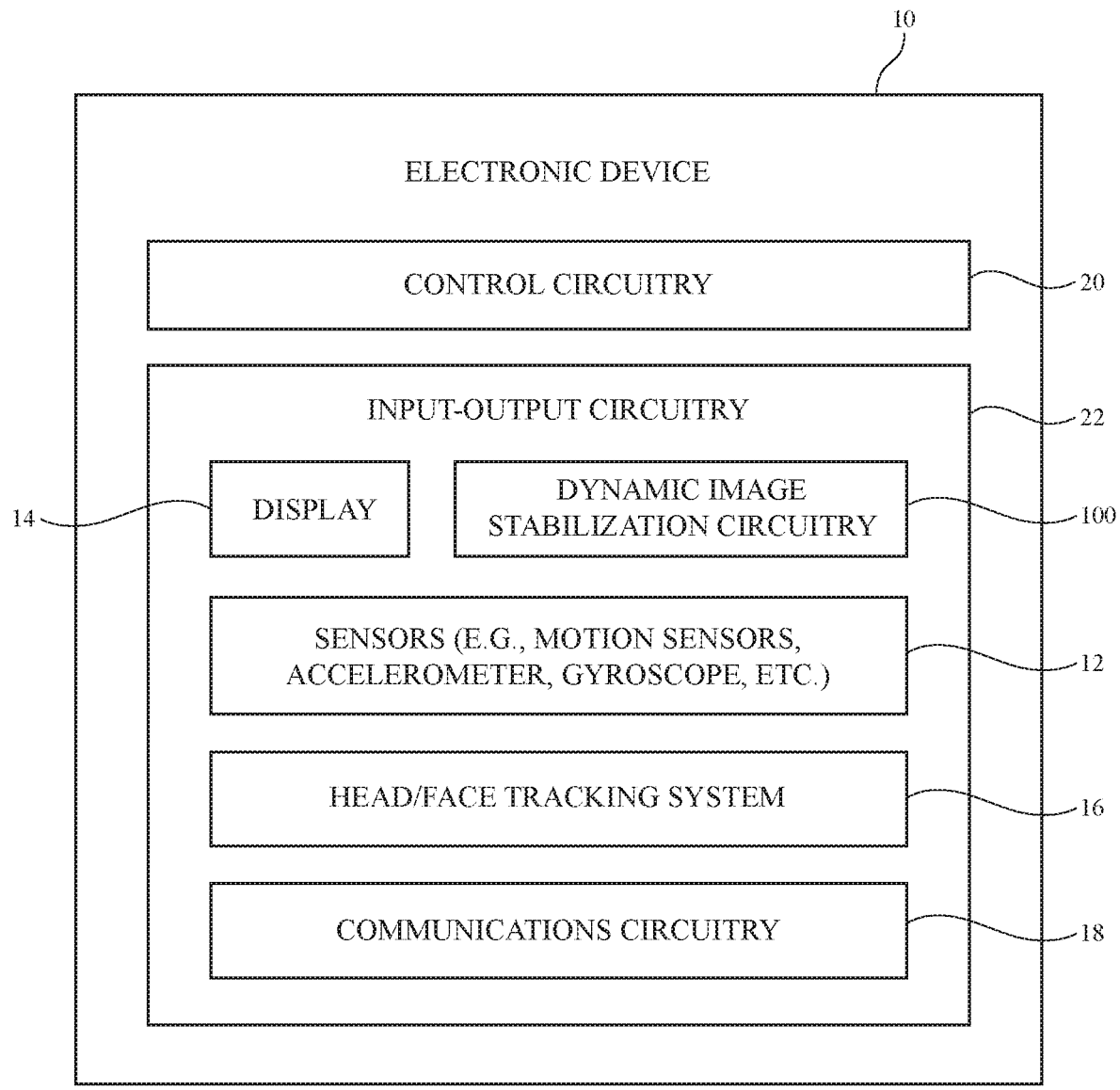
FIG. 1 is a schematic diagram of an illustrative electronic device in accordance with an embodiment.

A schematic diagram of an illustrative electronic device of the type that may be used in displaying image content to a user is shown in FIG. 1. Electronic device 10 may be a cellular telephone, a tablet computer, a head-mounted display, a head-up display (e.g., a display in an automobile or other vehicle), a laptop or desktop computer, a television, a wrist watch, or other portable electronic equipment. As shown in FIG. 1, electronic device 10 may have control circuitry 20. Control circuitry 20 may include storage and processing circuitry for controlling the operation of device 10. Circuitry 20 may include storage such as hard disk drive storage, nonvolatile memory (e.g., a solid-state drive), volatile memory (e.g., static or dynamic random-access-memory), etc.

Processing circuitry in control circuitry 20 may be based on one or more microprocessors, microcontrollers, digital signal processors, baseband processors, power management units, audio chips, graphics processing units, application-specific integrated circuits, and other integrated circuits. Software code may be stored on storage in circuitry 20 and run on processing circuitry in circuitry 20 to implement control operations for device 10 (e.g., operations associated with directing one or more sensors on device 10 to gather motion data and with directing electronic device 10 to perform dynamic image stabilization operations based on the gathered motion data, etc.).

Device 10 may include input-output circuitry 22. Input-output circuitry 22 may be used to allow data to be received by device 10 from external equipment (e.g., a computer or other electrical equipment) and to allow a user to provide device 10 with user input. Input-output circuitry 22 may also be used to gather information on the environment in which device 10 is operating. Output components in circuitry 22 may allow device 10 to provide a user with output and may be used to communicate with external electrical equipment.

As shown in FIG. 1, input-output circuitry 22 may include a display such as display 14. Display 14 may be used to display images for a user of device 10. Display 14 may be an organic light-emitting diode display, a liquid crystal display, a liquid-crystal-on-silicon display, a micromirror array display (e.g., a microelectromechanical systems (MEMS) display, sometimes referred to as a digital micromirror device), or any other suitable display.

User input and other information may be gathered using sensors 12. Sensors 12 may include, for example, position and motion sensors (e.g., inertia measurement units based on one or more sensors such as accelerometers, gyroscopes, magnetometers, and/or other devices for monitoring the movement, orientation, position, and location of device 10), force sensors, temperature sensors, touch sensors, buttons, capacitive proximity sensors, light-based proximity sensors, other proximity sensors, ambient light sensors, strain gauges, gas sensors, pressure sensors, moisture sensors, magnetic sensors, gesture sensors, depth sensors (e.g., three-dimensional structured light sensors and other depth sensors), and other sensors, which may include audio components such as microphones for gathering voice commands and other audio input.

In accordance with an embodiment, input-output circuitry 22 may include dynamic image stabilization circuitry 100 configured to compensator for undesired movements of device 10. It is difficult for a user to read image content on display 14 when device 10 is shaking or vibrating unpredictably. Scenarios when this might occur is when the user tries to read image content on display 14 while walking/jogging and holding device 10 in his/her hands, while walking/jogging on a treadmill and device 10 is mounted to the treadmill, while sitting in a moving vehicle and holding device 10 in his/her hands, while sitting in a moving vehicle and device 10 is mounted to the vehicle (e.g., using device 10 for GPS navigation purposes while driving), and other situations where device 10 might move around randomly with respect to the user's head.

Dynamic image stabilization circuitry 100 may analyze the data gathered from sensors 12 and may provide compensation by dynamically shifting around the image content to improve the legibility of the image content on display 14. Image stabilization circuitry 100 may automatically recognize which scenario device 10 is currently operating under and may provide strong compensation in situations where device 10 is shaking violently, intermediate compensation in situations where device 10 is shaking moderately, weak compensation in situations where device is shaking lightly, no compensation if device 10 is being moved around intentionally by the user, or other suitable amounts of compensation.

Input-output circuitry 22 may further include a user tracking system head (or face) tracking system 16. Head tracking system 16 may include cameras, light sources, and/or other equipment that is used to monitor the position of a user's head or face relative to the position of device 10. Generally, no image compensation should be applied when the movement of device 10 is in sync with the user's head (i.e., when the user is intentionally moving around device 10 in a predictable and controlled manner such that his/her gaze can be adequately maintained). In other words, image content compensation should only be applied when the movement of device 10 is out of sync (or uncoordinated) with the user's head (e.g., when the user's head is moving faster than device 10 or when device 10 is moving faster than the user's head). Thus, by taking into account the data generated by head tracking system 16 in addition to the data generated by sensors 12, dynamic image stabilization circuitry 100 can more accurately determine scenarios where image content compensation is required and also the degree of compensation that is required (e.g., by analyzing the relative movement of device 10 with respect to the user's head), which improves the accuracy and effectiveness of dynamic image stabilization circuitry 100.

Input-output circuitry 22 may further include communications circuitry 18. Communications circuitry 18 may include wired communications circuitry (e.g., circuitry for transmitting and/or receiving digital and/or analog signals via a port associated with a connector) and may include wireless communications circuitry (e.g., radio-frequency transceivers and antennas) for supporting communications with external wireless equipment. The wireless communications circuitry may include wireless local area network circuitry (e.g., WiFi® circuitry), cellular telephone transceiver circuitry, satellite positioning system receiver circuitry (e.g., a Global Positioning System receiver for determining location, velocity, etc.), near-field communications circuitry, and/or other wireless communications circuitry.

Figure 2A:
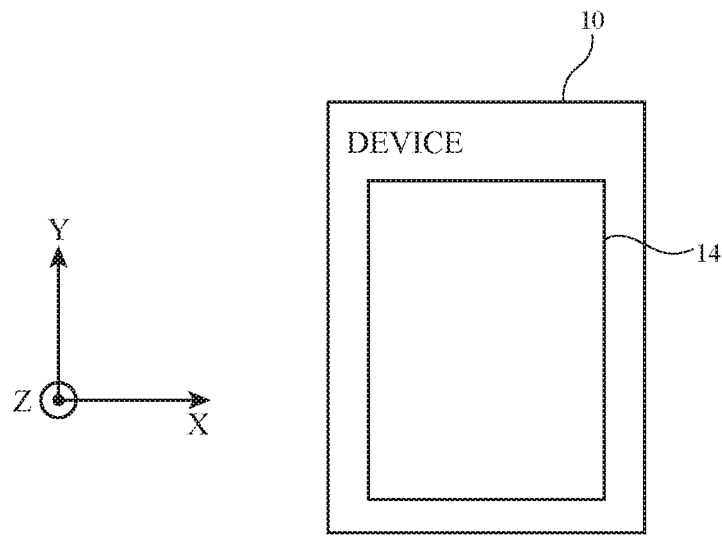
FIG. 2A is a diagram showing types of movements that can be sensed by an accelerometer in accordance with an embodiment.

FIG. 2A is a diagram showing types of movements that can be sensed using an accelerometer (e.g., an accelerometer within sensor 12 of FIG. 1). As shown in FIG. 2A, the accelerometer is capable of sensing linear acceleration of device 10 in the X direction, in the Y direction (where display 14 is on the same plane as the X-Y plane), and/or the Z direction (where Z is orthogonal to the X-Y plane).

Figure 2B:
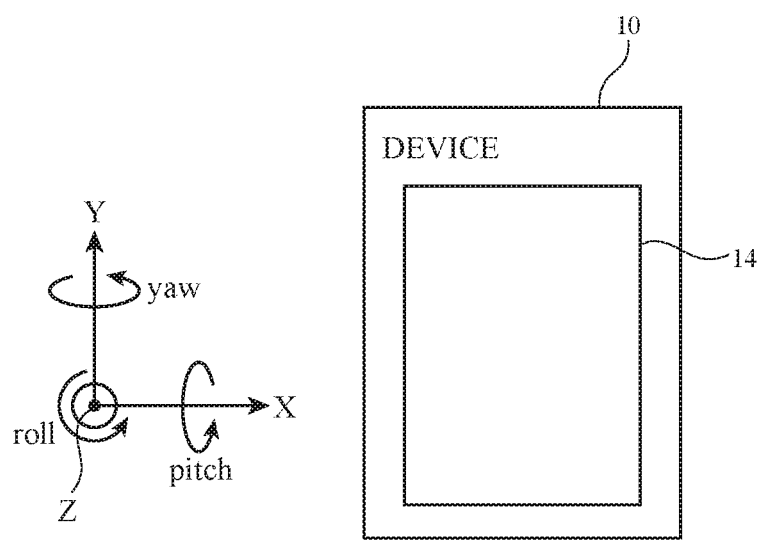
FIG. 2B is a diagram showing types of movements that can be sensed by a gyroscope in accordance with an embodiment.

FIG. 2B is a diagram showing types of movements that can be sensed using a gyroscope (e.g., a gyroscope within sensor 12 of FIG. 1). As shown in FIG. 2B, the gyroscope is capable of sensing rotational or angular velocity of device 10 such as the yaw of device 10 about the Y-axis, the pitch of device 10 about the X-axis, and the roll of device 10 about the Z-axis.

The types of device movements that can be sensed using sensor 12 as shown in FIGS. 2A and 2B are merely illustrative. If desired, sensor 12 may include other sensing components for gathering other types of movement at device 10.

Figure 3:
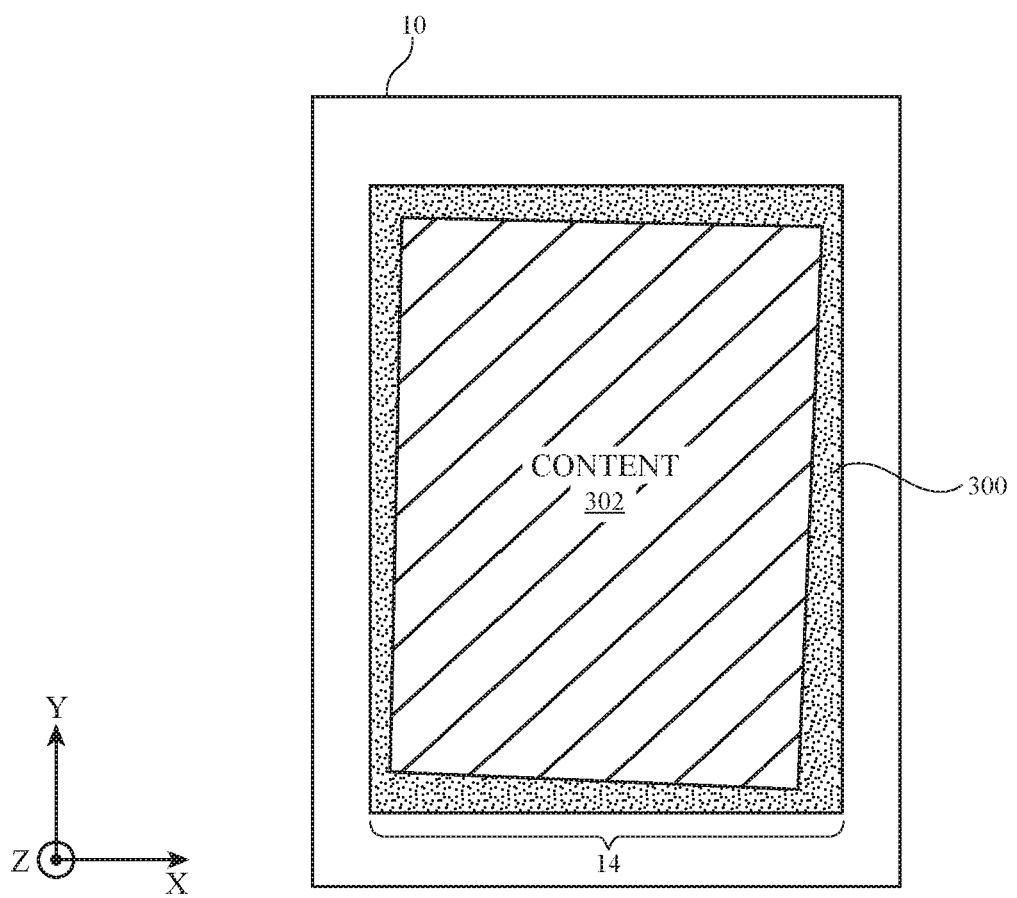
FIG. 3 is a diagram showing an optional cushion that can be provided around an image content to prevent content clipping during dynamic image stabilization in accordance with an embodiment.

FIG. 3 is a diagram showing an optional cushion such as margin 300 that can be provided around an image content 302 on display 14. The additional margin 300, the amount of which is exaggerated in FIG. 3 for illustrative purposes only, should not be noticeable to the user. Margin 300 allows image content 302 to be dynamically adjusted by dynamic image stabilization circuitry 100 of FIG. 1 without clipping portions of image content 302. For example, image content 302 may be shifted horizontally in the X direction, vertically in the Y direction, diagonally in both X and Y directions (i.e., shifting the image content along the plane of the display), and/or magnified by zooming in in the Z direction or minified by zooming out in the Z direction. Cushion 300 helps prevent content clipping while content 302 is being shifted or magnified/minified.

Figure 4:
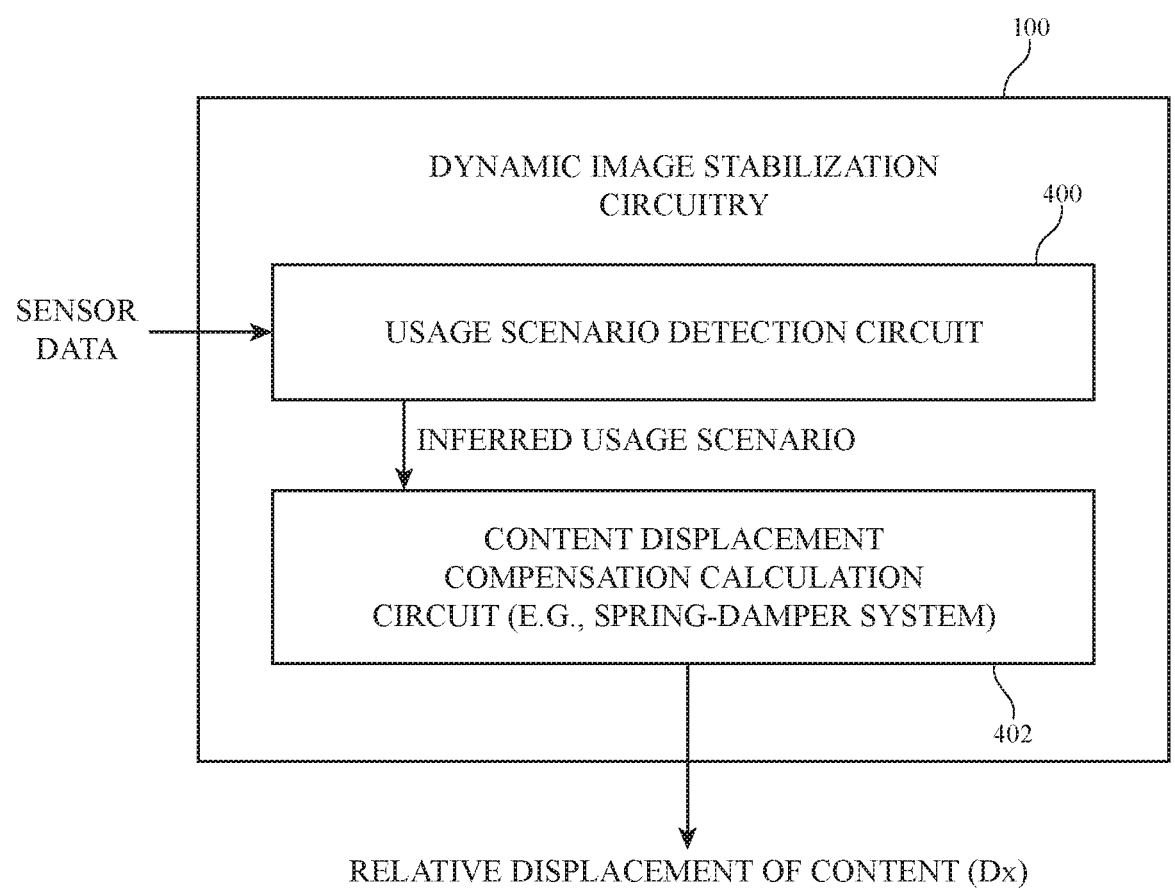
FIG. 4 is a diagram of illustrative dynamic image stabilization circuitry in accordance with an embodiment.

FIG. 4 is a diagram of dynamic image stabilization circuitry 100. As shown in FIG. 4, circuitry 100 may include a classifier such as a usage scenario detection circuit 400 and a computation circuit such as content displacement compensation calculation circuit 402. Usage scenario detection circuit 400 may receive sensor data (e.g., data gathered using sensors 12, data gathered using head tracking system 16, or other motion sensor data) and may be configured to infer a usage scenario based on the received sensor data. Details of detection circuit 400 are described below in connection with FIG. 5.

After usage scenario detection circuit 400 determines a usage scenario, content displacement compensation calculation circuit 402 can then compute a relative image content displacement amount ($D_X$). As an example, if the sensor data indicates that device 10 is currently moving quickly in a first direction by an amount $S_X$, calculation circuit 402 may output $D_X$ that directs display 14 to shift the image content by amount $D_X$ in a second direction that opposes the first direction (i.e., the image content may be shifted in the opposite direction as the movement of the device). The magnitude of $D_X$ relative to $S_X$ may depend on the detected usage scenario and the strength of compensation that is needed for that particular usage scenario. For example, if strong compensation is needed, the magnitude of $D_X$ may be relatively close to the magnitude of $S_X$. If, however, only weak compensation is required, the magnitude of $D_X$ need not be close to that of $S_X$. As an example, circuit 402 may be configured to compute $D_X$ based on a spring-damper system to provide smooth compensation that is pleasing for the user, the details of which are described below in connection with FIG. 6.

Figure 5:
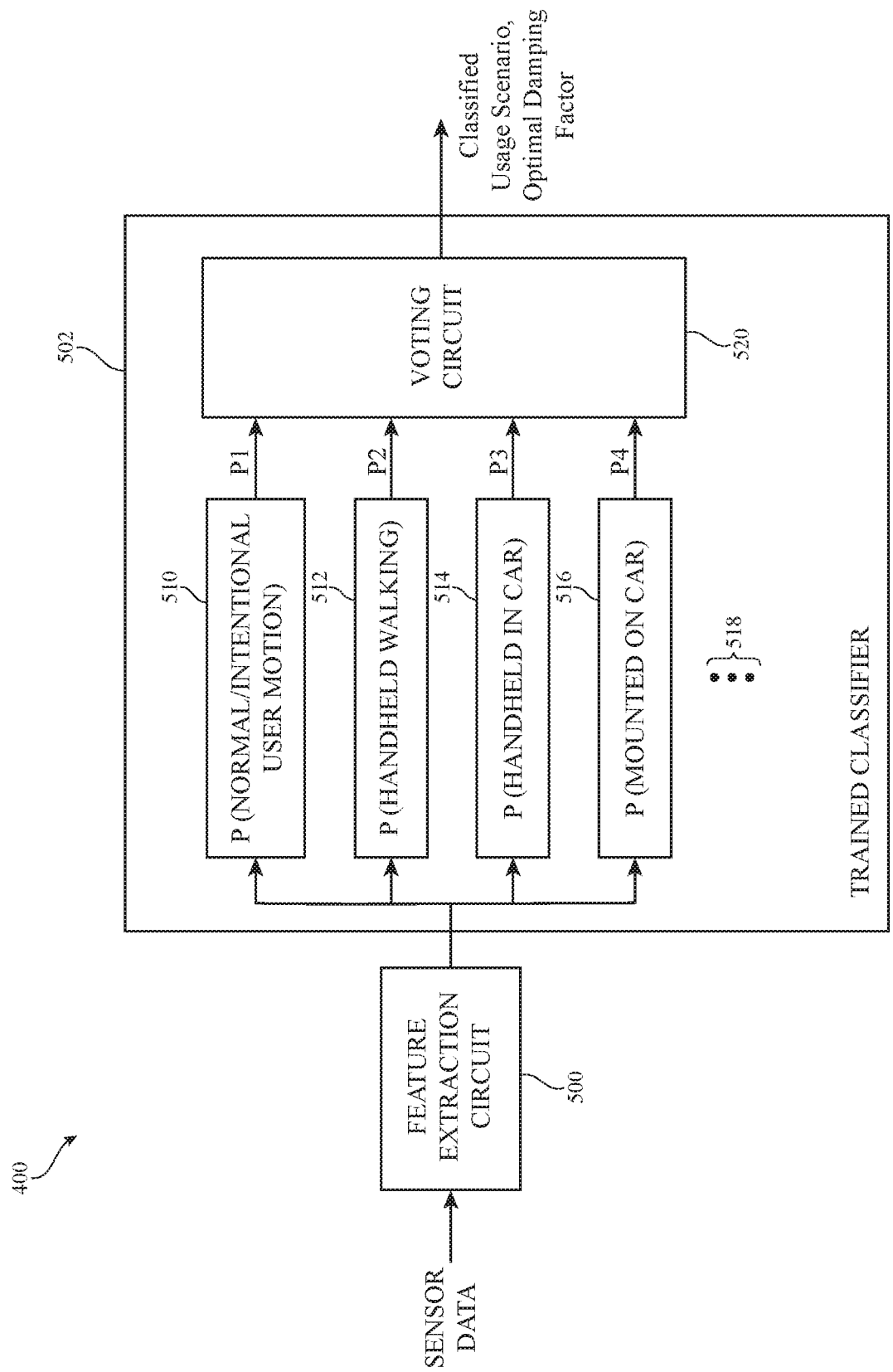
FIG. 5 is a diagram of an illustrative usage scenario detection circuit in accordance with an embodiment.

FIG. 5 is a diagram showing one suitable implementation of usage scenario detection circuit 400, which is based on machine learning techniques. As shown in FIG. 5, circuit 400 may include a feature extraction circuit 500 and a trained classifier circuit 502. Feature extraction circuit 500 may receive the sensor data (e.g., data gathered using sensors 12, data gathered using head tracking system 16, or other motion sensor data) and may extract features from the sensor data. Features that can be extracted may include the direction of movement, the amount of movement, the velocity/acceleration of movement, the oscillation frequency of the movement/vibration/shaking (if any), the orientation and position of the user's head, the gaze of the user's eyes, or other suitable features that can help determine the usage scenario that the device is currently operating in.

The extracted features are then fed to trained classifier circuit 502. Circuit 502 may be trained using a form of supervised machine learning and may be capable of performing classification predictive modeling. For example, circuit 502 may receive the extracted features as input variables and use a trained mapping function to predict a corresponding class (sometimes also referred to as the category or label) for the given sensor data. The training may be performed in a lab or other controlled environment by feeding in a training dataset and labeling each dataset with a target class. Examples of classification approaches that may be used by circuit 400 include decision tree techniques such as simple thresholding techniques, random-forest (bootstrap) techniques, partition method decision tree techniques, discrimination analysis techniques (e.g., linear or quadratic), nearest neighbor techniques, support vector machines, and other suitable techniques (e.g., neural network techniques). These classification techniques may, if desired, be implemented using machine learning.

In the example of FIG. 5, circuit 502 is capable of predicting the probability of a given set of features belonging to classes 510, 512, 514, and 516. Class 510 may represent a first category or usage scenario where the user is moving the device intentionally, which means minimal image stabilization compensation is required. Class 512 may represent a second category or usage scenario where the user is handholding the device while walking, which could be a situation where weak image stabilization compensation is required. Class 514 may represent a third category or usage scenario where the user is handholding the device while sitting in a moving vehicle, which could be a situation where moderate image stabilization compensation is needed. Class 516 may represent a fourth category or usage scenario where the user is sitting in a moving device while the device is mounted to the moving vehicle, which could be a situation where strong image stabilization compensation is needed. These discrete classes or labels are merely illustrative. In general, classifier 502 may be trained to model and predict other possible usage scenarios, as indicated by ellipses 518.

The probabilities output from each class (e.g., class 510 outputting P1, class 512 outputting P2, class 514 outputting P3, class 516 outputting P4, etc.), which represent the likelihood or confidence for a given set of features as belonging to each class, can be converted to a final class value by selecting the class label that has the highest probability. In the example of FIG. 5, classifier 502 uses a voting circuit 520 to output an inferred or classified usage scenario (i.e., voting circuit 520 will output choose the class with the highest probability). For example, consider a scenario where P1 is equal to 0.02, P2 is equal to 0.89, P3 is equal to 0.05, and P4 is equal to 0.04. In this scenario, since P2 is the highest, circuit 502 will infer a usage scenario where the user is currently handholding the device while walking (see class 512).

Depending on the detected usage scenario, classifier circuit 502 may also output a corresponding damping factor that is optimized for smooth compensation for that particular usage scenario. In contrast to the way in which circuit 502 determines the usage scenario, circuit 502 uses regression predictive modeling to predict the optimal damping factor for each usage scenario. Unlike classification predictive modeling (which is a categorical technique), regression is a quantitative technique based on user data or a training dataset that allows circuit 400 to output the damping factor as a continuous variable. Different usage scenarios will require different damping factors for smooth compensation, and the optimal damping factor for each scenario is determined using regression techniques. Examples of regression approaches that may be used by circuit 400 include linear regression, logistic regression, polynomial regression, stepwise regression, ridge regression, lasso regression, and other suitable techniques. These regression techniques may, if desired, be implemented using machine learning.

The exemplary implementation of FIG. 5 in which circuit 400 is configured to predict the most likely usage scenario using machine-learning-based classification techniques and to predict the optimal damping factor using machine-learning-based regression techniques is merely illustrative and is not intended to limit the scope of the present embodiments. If desired, other suitable techniques for accurately deducing the current usage scenario and computing the optimal damping factor for smooth compensation may be applied.

Figure 6:
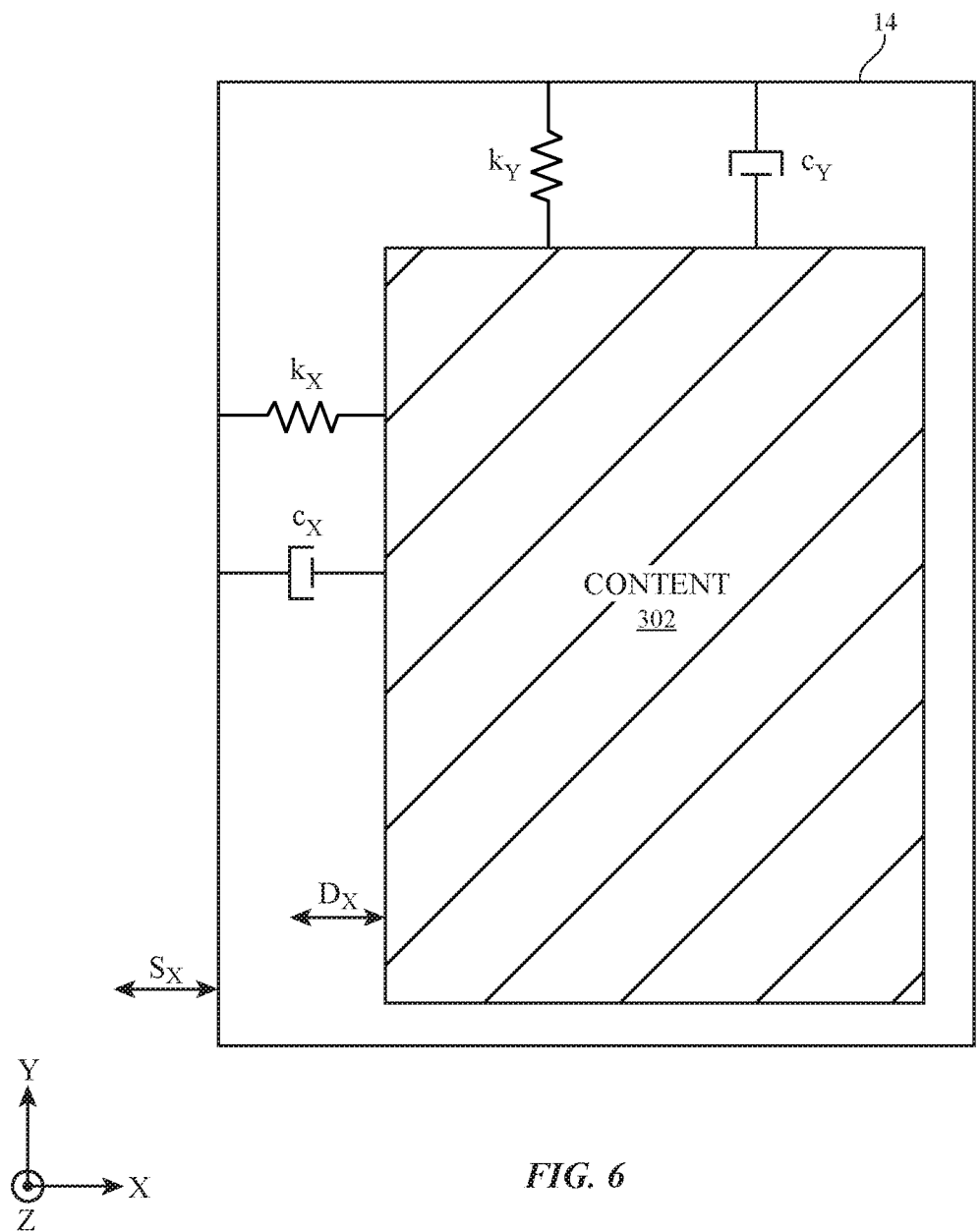
FIG. 6 is a diagram of an illustrative spring-damper model for computing the image content displacement in accordance with an embodiment.
Figure 7:
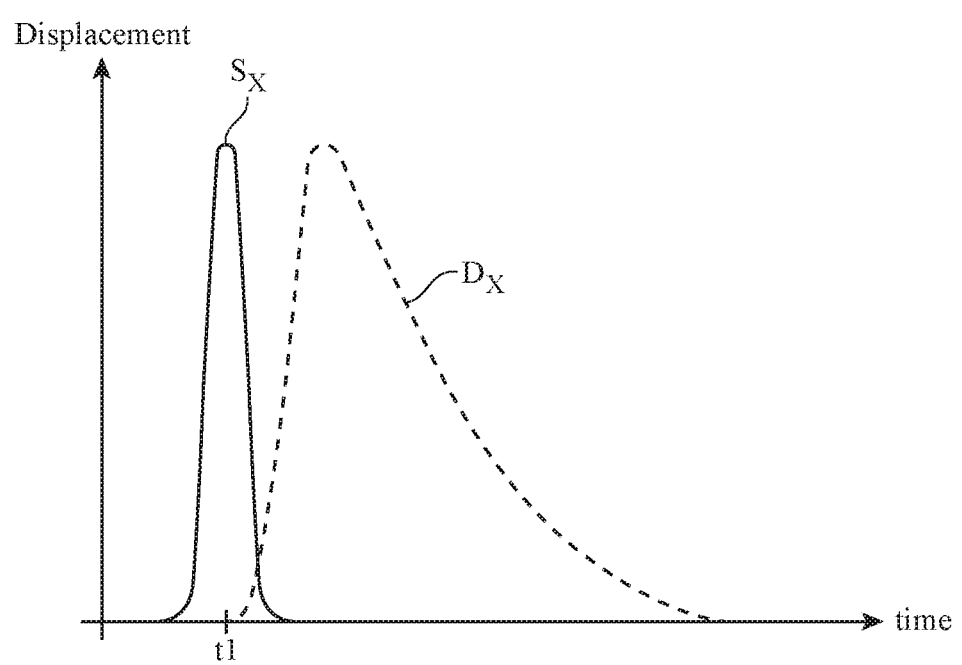
FIG. 7 is a plot illustrating how the image content displacement follows the physical device displacement and gradually drifts back to the center after motion stops in accordance with an embodiment.

The damping factor generated by usage scenario detection circuit 400 is used by content displacement compensation calculation circuit 402 to compute image content displacement amount $D_X$ (see, e.g., FIG. 4). Circuit 402 may compute $D_X$ based on a spring-damper model as shown in FIG. 6. As shown in FIG. 6, $S_X$ represents the detected displacement of the electronic device in the X direction (e.g., $S_X$ may be the numerical output of an accelerometer), whereas $D_X$ represents the relative displacement of the image content 302 within the borders of display 14 computed by circuit 402. FIG. 7 is a plot illustrating how the image content displacement $D_X$ follows the physical device displacement $S_X$ (detected at time t1) and gradually drifts back to the center after motion stops. The drift back behavior may be controlled by a spring-damper system for smooth compensation.

Referring back to FIG. 6, parameter $k_X$ may represent a spring constant or a dragging force that impacts the oscillation factor of the spring-damper system in the X direction, whereas parameter $c_X$ may represent a damping coefficient that impacts the settling time of the spring-damper system in the X direction. Modeled in this way, the spring-damper system can be expressed as an ordinary differential equation in the X direction:

$$\frac{d^2 S_X}{dt^2} + \frac{d^2 D_X}{dt^2} + \frac{c_X}{m}\left(\frac{dD_X}{dt}\right) + \frac{k_X}{m} D_X = 0 \qquad (1)$$

where m represents the hypothetical "mass" of the image content (a value that is predetermined). The ratio ($c_X$/m) is the damping factor, whereas the ratio ($k_X$/m) is the oscillation factor. Circuit 402 may be configured to solve equation 1 for image content displacement $D_X$ since all other variables are known or pre-selected. Circuit 402 may select or extract a damping factor from the sensor inputs to help achieve critical damping such that there is no lingering oscillation when the image content drifts back to the center of display 14. As described above in connection with FIG. 5, the determination of the critical damping factor may be performed using regression techniques.

The calculation of $D_X$ described above for compensation in only the X direction is merely illustrative. In general, content displacement compensation calculation circuit 402 may solve for the desired displacement, based on the received sensor data, in the Y direction (e.g., using spring-damper parameters $k_Y$ and $c_Y$), in the Z direction (e.g., by magnifying or minifying the image content), in the yaw/roll/pitch rotational directions (see, e.g., FIG. 2B), etc. In practice, the calculated displacement values may be fed to display driver circuitry associated with display 14, which will then adjust the image content by shifting, rotating, tilting, or zooming the image content on the display accordingly.

Figure 8:
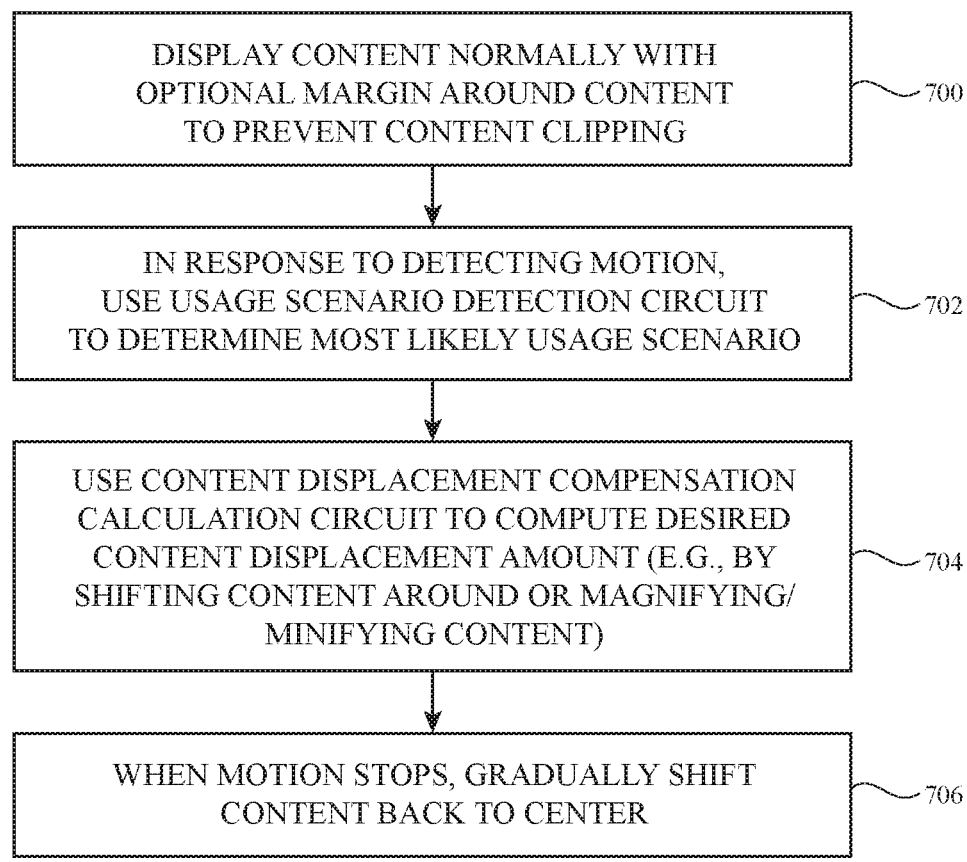
FIG. 8 is a flow chart of illustrative steps for operating an electronic device of the type that includes dynamic image stabilization circuitry in accordance with an embodiment.

FIG. 8 is a flow chart of illustrative steps for operating electronic device 10 of the type that includes dynamic image stabilization circuitry 100. At step 700, device 10 may display content normally with optional cushion/margin around the image content to prevent content clipping during subsequent image shifting operations (see, e.g., FIG. 3).

In response to detection with sensors 12, usage scenario detection circuit 400 within the dynamic image stabilization circuitry 100 may be used to determine the most likely usage scenario (at step 702). In one suitable arrangement, circuit 400 may be configured and trained using a classification and/or regression approach. If desired, circuit 400 may be configured to accurately predict the current usage scenario and optimal damping factor using other suitable data modeling approaches.

At step 704, content displacement compensation calculation circuit 402 may be used to compute the desired content displacement amount in various directions. For example, circuit 402 may output an amount $D_X$ for shifting the image content in the X direction, an amount $D_Y$ for simultaneously shifting the image content in the Y direction, an amount $D_Z$ for optionally zooming the image content in the Z direction, an amount $D_{YAW}$ for optionally tilting the image, etc. Dynamically adjusting the image content helps align the user's gaze and can help mitigate motion sickness that may be experienced by the user in the various usage scenarios.

When the motion finally stops as determined by sensors 12, dynamic image stabilization circuitry 100 may gradually shift the image content back to the center of the display screen. In one suitable arrangement, the rate of the gradual shift may be determined using a spring-damper system (e.g., circuit 400 may use regression techniques to extract an optimal damping factor to circuit 402 to help achieve smooth compensation). In other suitable arrangements, the dynamic adjustment of the image content displacement may be computed using other suitable data modeling techniques.

Figure 9A:
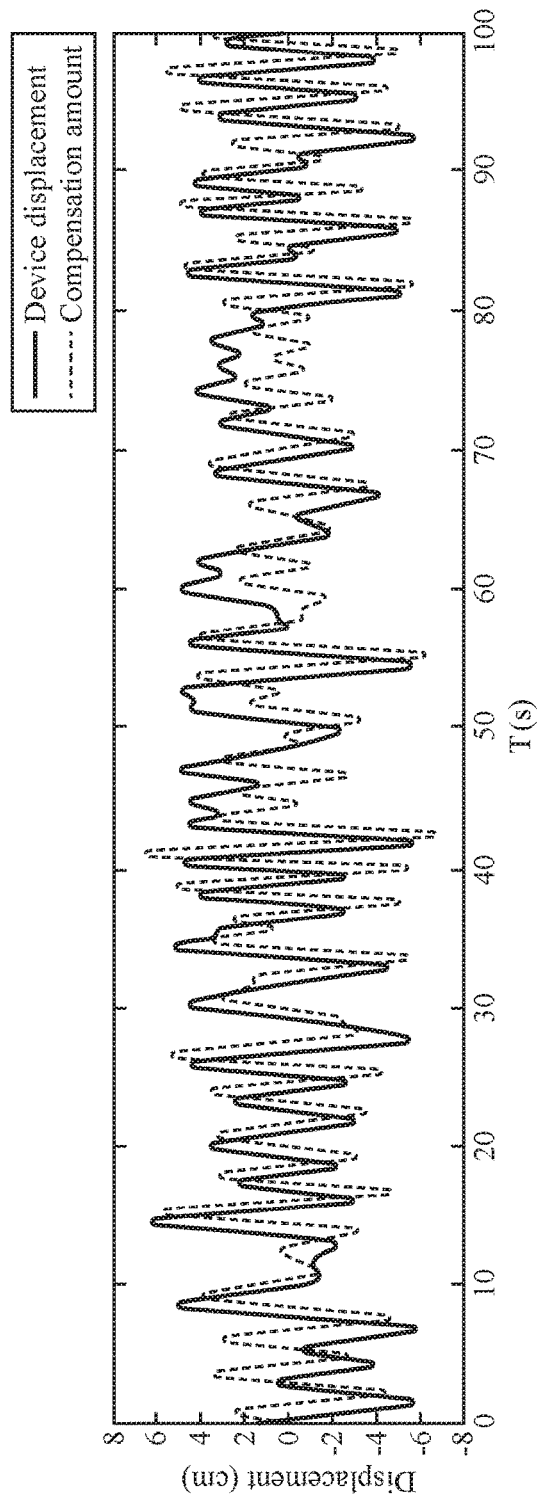
FIG. 9A is a timing diagram showing how compensations follows device displacement when the device is shaking unpredictably in accordance with an embodiment.

FIG. 9A is a timing diagram showing how the calculated compensation (i.e., the image content displacement amount) follows the device displacement when the device is shaking unpredictably. As shown in FIG. 9A, usage scenario detection circuit 400 may determine that this is a scenario where moderate compensation is required (e.g., such as when the user is handholding and looking at the display screen while walking), so the calculated compensation will track the device displacement with minimal latency. Even though the waveforms of FIG. 9A show the device displacement and the image compensation amount as being the same polarity, in practice, display 14 is configured to shift the image content in the opposite direction as the detected device displacement to help align the user's gaze and reduce motion sickness.

Figure 9B:
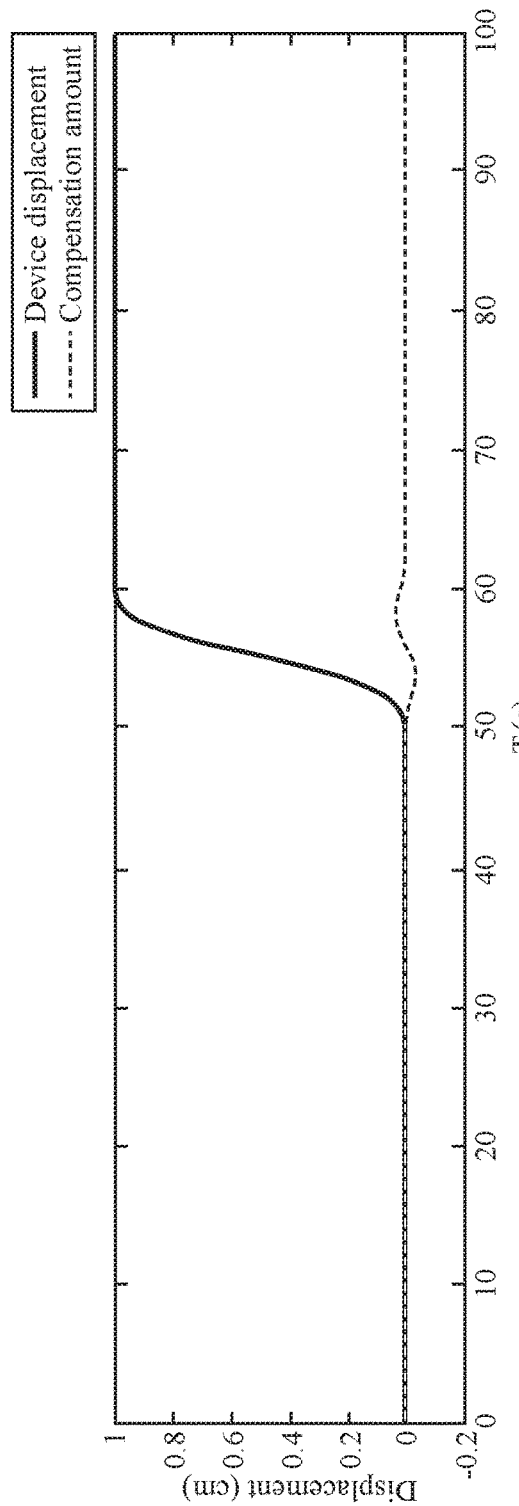
FIG. 9B is a timing diagram showing minimal compensation when the device is moved intentionally in accordance with an embodiment.

FIG. 9B is a timing diagram showing minimal compensation when the device is moved intentionally. As shown in FIG. 9B, even though the device moves to a new position, dynamic image stabilization circuitry 100 is capable of detecting that this is a scenario where minimal compensation is required (e.g., such as when the user is intentionally moving the device or when the user is capable of maintaining his gaze in a situation where the degree of device displacement is manageable). In such scenarios, the compensation amount that is needed is minimal.

Figure 10:
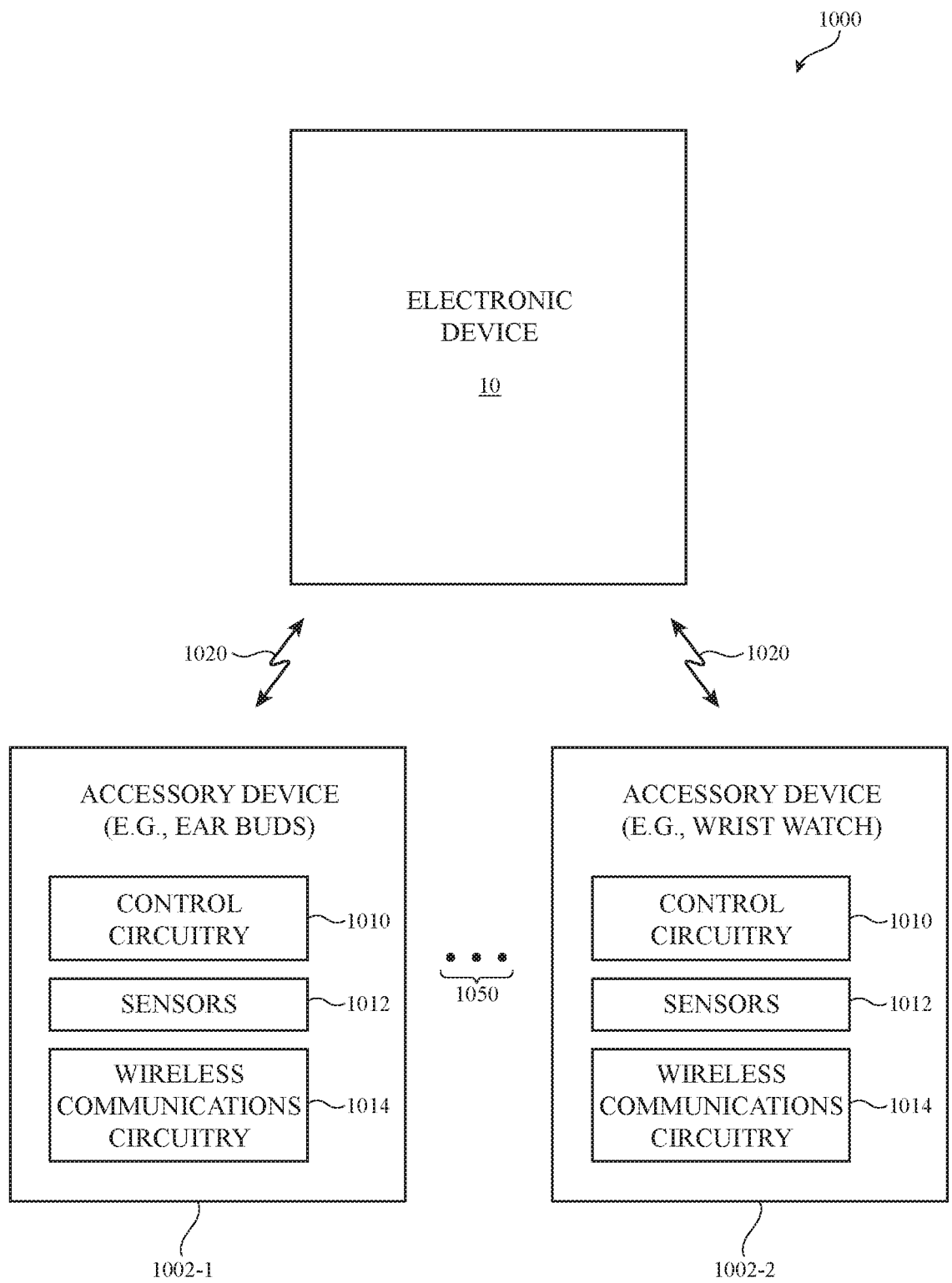
FIG. 10 is a diagram of an illustrative system in which the electronic device is configured to receive additional sensor data from one or more accessory devices to help improve the accuracy of dynamic image stabilization in accordance with an embodiment.

The embodiments of FIGS. 1-9 where dynamic image stabilization circuitry 100 performs image displacement compensation based on sensor data obtained using sensors 12 within device 10 is merely illustrative. In general, dynamic image stabilization circuitry 100 may perform image displacement compensation using sensor data obtained from sensors external to device 10. FIG. 10 is a diagram of an illustrative system 1000 in which electronic device 10 (which contains dynamic image stabilization circuitry 100 as shown in FIG. 1) is configured to receive additional sensor data from one or more accessory devices to help improve the accuracy of dynamic image stabilization.

As shown in FIG. 10, a first accessory device may be a set of ear buds 1002-1 or at least one ear bud that includes control circuitry 1010 (e.g., control circuitry such as control circuitry 20 of device 10), wireless communications circuitry 1014 (e.g., one or more radio-frequency transceivers for supporting wireless communications over links 1020), and may have one or more sensors 1012 (e.g., sensors of the type that may be included in device 10). A second accessory device may be a wrist watch 1002-2 that includes control circuitry 1010, wireless communications circuitry 1014, and may have one or more sensors 1012 (e.g., sensors of the type that may be included in device 10). In general, any suitable number of devices that is capable of gather sensor data on the user may be paired with device 10 (as indicated by ellipses 1050).

Configured in this way, one or more of the accessory devices may gather additional sensor data using sensors 1012 (which may include additional data on the user such as the movement of the user's head, the movement of the user's body, etc.) and may send this information to device 10 via links 1020. Dynamic image stabilization circuitry 100 may use the sensor data gathered by sensors 12 and also the sensor data gathered by sensors 1012 to further improve the accuracy of the image content compensation.

The foregoing is merely illustrative and various modifications can be made to the described embodiments. The foregoing embodiments may be implemented individually or in any combination.

What is claimed is:

1. A method of operating an electronic device having a display, the method comprising:
   outputting an image content on the display;
   with a motion sensor within the electronic device, detecting a shake at the electronic device;
   determining whether the detected shake is a weak shake, a moderate shake, or a strong shake; and
   with image stabilization circuitry, performing:
      weak image stabilization on the image content in response to determination that the detected shake is a weak shake;
      moderate image stabilization on the image content in response to determination that the detected shake is a moderate shake; and
      strong image stabilization on the image content in response to determination that the detected shake is a strong shake.

2. The method of claim 1, wherein the motion sensor comprises a selected one of an accelerometer and a gyroscope.

3. The method of claim 1, further comprising:
   with a head tracking system within the electronic device, detecting movement of a user's head with respect to the display of the electronic device; and
   adjusting the image content only when the movement of the user's head is out of sync with the movement of the electronic device.

4. The method of claim 1, wherein adjusting the image content comprises shifting the image content along the plane of the display, the method further comprising:
   with the motion sensor, detecting when the electronic device has stopped moving; and
   when the motion sensor detects that the electronic device has stopped moving, gradually shifting the image content back to a center of the display.

* * * * *